(12) United States Patent
Wendt et al.

(10) Patent No.: US 10,465,748 B2
(45) Date of Patent: Nov. 5, 2019

(54) COMPONENT OF A UNIVERSAL JOINT BEARING

(71) Applicant: Aktiebolaget SKF, Gothenburg (SE)

(72) Inventors: Volker Wendt, Uechtelhausen/Zell (DE); Padelis Katsaros, Schweinfurt (DE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/809,050

(22) Filed: Nov. 10, 2017

(65) Prior Publication Data

US 2018/0142731 A1    May 24, 2018

(30) Foreign Application Priority Data

Nov. 23, 2016 (DE) .................. 10 2016 223 211

(51) Int. Cl.

| F16C 33/58 | (2006.01) |
|---|---|
| F16C 33/46 | (2006.01) |
| F16C 19/26 | (2006.01) |
| F16C 21/00 | (2006.01) |
| F16C 33/64 | (2006.01) |
| F16D 3/38 | (2006.01) |
| F16D 3/16 | (2006.01) |
| F16C 19/28 | (2006.01) |
| F16D 3/41 | (2006.01) |

(52) U.S. Cl.
CPC .......... *F16C 33/4617* (2013.01); *F16C 19/26* (2013.01); *F16C 21/005* (2013.01); *F16C 33/64* (2013.01); *F16D 3/385* (2013.01); *F16C 19/28* (2013.01); *F16C 2220/60* (2013.01); *F16C 2361/41* (2013.01); *F16D 3/16* (2013.01); *F16D 3/41* (2013.01); *F16D 2250/00* (2013.01)

(58) Field of Classification Search
CPC ........ F16C 19/26; F16C 19/46; F16C 19/463; F16C 19/466; F16C 33/581; F16C 33/588; F16C 33/64; F16C 2220/60; F16C 2220/62; F16C 2220/66; F16C 2220/70; F16C 2361/41; B23B 5/26; B23B 41/12; B23B 2215/12; B23B 2270/22
USPC ........................................ 384/569
See application file for complete search history.

(56) References Cited

U.S. PATENT DOCUMENTS

| 4,325,593 | A | * | 4/1982 | Mallet | ............... F16C 13/006 384/127 |
|---|---|---|---|---|---|
| 4,522,504 | A | * | 6/1985 | Greverath | ............. B01F 5/0615 138/40 |
| 5,746,658 | A | * | 5/1998 | Duggan | .............. F16C 19/46 464/130 |
| 6,161,961 | A | * | 12/2000 | Diemer | ............... F16C 21/005 384/127 |

(Continued)

*Primary Examiner* — Phillip A Johnson
(74) *Attorney, Agent, or Firm* — Bryan Peckjian; SKF USA Inc. Patent Dept.

(57) ABSTRACT

A component of a universal joint bearing includes at least one casing having a cylindrical wall and a base and at least one formation projecting from the base. The at least one formation is receivable in a clamp of a rotational processing machine to secure the component to the rotational processing machine during a rotational machining of a wall of the component. Also a method that includes clamping the component by the formation and machining inner and outer surfaces of the component without unclamping the component.

14 Claims, 1 Drawing Sheet

(56) References Cited

U.S. PATENT DOCUMENTS 7,934,872 B2 * 5/2011 Hashimoto ........... F16C 19/466
                                                                            29/898.067

* cited by examiner

COMPONENT OF A UNIVERSAL JOINT BEARING

CROSS-REFERENCE

This application claims priority to German patent application no. 10 2016 223 211.8 filed on Nov. 23, 2016, the contents of which are fully incorporated herein by reference.

TECHNOLOGICAL FIELD

The disclosure is directed to a component of a universal joint bearing having a configuration that allows for a simplified rotational machining.

BACKGROUND

A component of a universal joint bearing is known that has a surface region shaped like part of a cylindrical casing. The surface region is part of an approximately hollow-cylindrical section of the component. During manufacturing of the component, the component is first clamped on the outer side of this section so that an inner side of the section can be processed. The component is subsequently clamped on the inner side of the section and the outer side is processed.

SUMMARY

An aspect of the disclosure comprises in particular in achieving a high efficiency.

The disclosure is directed to a component of a universal joint bearing including at least one surface region that has the shape of a part of a cylindrical casing.

According to the disclosure, a base of the component includes at least one formation on which the component is clampable for a rotational machining of a wall of the component. According to the disclosure a high efficiency can be achieved. In particular, it can be achieved that a rotational machining of an inner side of the component and a rotational machining of an outer side of the component are performable with a single clamping which saves time and reduces cost. In particular, a wall of the component can be manufactured with only a very slightly varying wall thickness.

Furthermore, a method for processing a wall of a component of a universal joint bearing is disclosed in which the component is clamped on a formation on a base of the component and subsequently, while the component is clamped on the formation, the wall is processed on its inner side and on its outer side. A high efficiency can thereby be achieved. In particular, the wall can be manufactured with only very slightly varying wall thickness. Furthermore, in particular a low manufacturing effort, a time savings, and a cost savings can be achieved.

In a further aspect, the disclosure comprises a component of a universal joint bearing that has at least one casing having a cylindrical wall and a base and at least one formation projecting from the base. The at least one formation is receivable in a clamp of a rotational processing machine to secure the component to the rotational processing machine during a rotational machining of a wall of the component.

In yet another aspect, the disclosure comprises a method for processing a wall of a component of a universal joint bearing. The method includes clamping the component by a formation on a base of the component, and, while the component is clamped, machining an inner cylindrical surface or an outer cylindrical surface of the component, and, without unclamping the formation, machining the outer cylindrical surface or the inner cylindrical surface of the component.

Further advantages arise from the following description of the drawings. An exemplary embodiment of the invention is depicted in the drawings. The drawings, the description, and the claims contain numerous features in combination. The person skilled in the art will also advantageously consider the features individually and combine them into further meaningful combinations.

DETAILED DESCRIPTION

Figure 1:
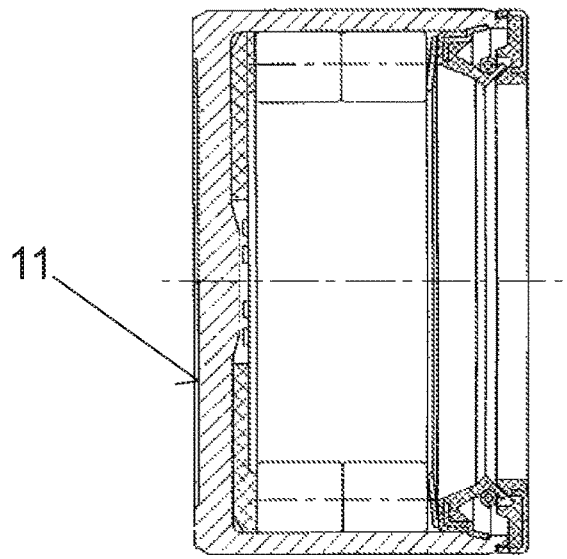
FIG. 1 is a sectional elevational view of a portion of a conventional universal joint bearing.

FIG. 1 shows a longitudinal section through a universal joint bearing of the prior art. A pot-shaped component of the universal joint bearing includes an essentially flat base surface 11.

Figure 2:
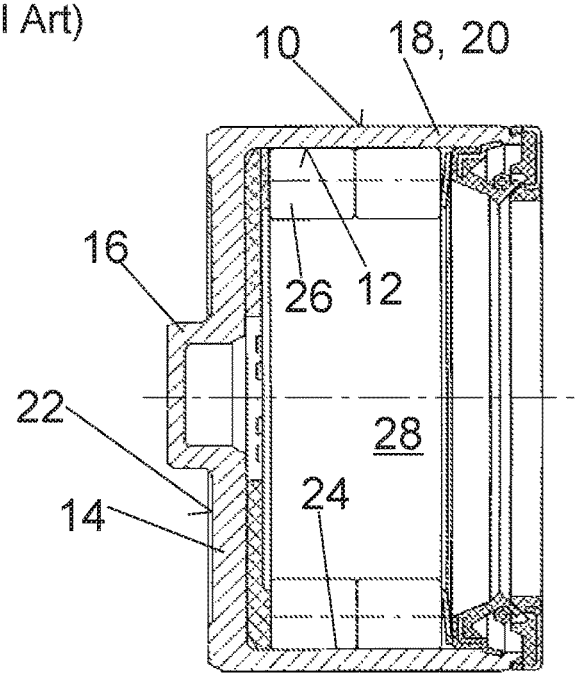
FIG. 2 is a sectional elevational view of a portion of a universal joint bearing according to the present disclosure.

FIG. 2 shows a longitudinal section along an axial direction of a universal joint bearing including a component 20 according to the disclosure. The component includes a radially outer surface region 10 that has the shape of a cylindrical casing. The component comprises a base 14 that includes an essentially flat base surface 22 on its underside. The component further includes a formation 16 on its base at which the component is clampable for a rotational machining of a wall 18 of the component. The formation 16 is an elevation or projection that extends away from an inner side 24 of the component starting from the base surface 14. The elevation has a height of approximately 5 mm relative to the base surface 14. Furthermore, the elevation is configured pot-shaped or cup-shaped.

The component includes a raceway 12 on its inner side on which rolling elements 26, which form a first set of rolling elements, roll during operation. In addition to the raceway 12 a further raceway is disposed on the inner side, on which further raceway a second set of rolling elements rolls during operation. Inner-ring raceways are formed by a pin 28 of a joint cross of a universal joint. In addition, the universal joint bearing includes a seal that seals between the pin and an end of the component 20 that is facing away from the formation 16.

The component 20 is configured one-piece.

In a method for manufacturing the wall 18, wherein a preform of the wall 18, which can also be referred to as wall, is used as a starting material, the component is clamped on the formation 16 and subsequently, while the component remains clamped on the formation, the wall is processed by a lathe tool on the inner side 24 and on the radial outer side of the wall. A thickness of the wall 18 is thereby set very precisely. Here the advantage is exploited that by clamping the wall on the formation 16 both outer side and inner side are accessible for the rotational machining With such a clamping on the formation 16 it is further advantageous that the radial outer edge of the base 14 is also accessible for a processing, in particular for a rotational machining or lathing. In a fully assembled state a securing ring abuts on this edge of the base.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved universal joint bearing components.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Surface region
11 Base surface
12 Raceway
14 Base
16 Formation
18 Wall
20 Component
22 Base surface
24 Inner side
26 Rolling elements
28 Pin

What is claimed is:

1. A component of a universal joint bearing comprising: at least one radially outer surface region that has the shape of a cylindrical casing,
a base that includes a flat base surface on an outer side, and
at least one cylindrical formation projecting from the base, the cylindrical formation provides a clampable surface for a rotational machining of a wall of the at least one radially outer surface region.

2. The component according to claim 1, wherein the formation is an elevation extending away from an inner side of the component starting from a surface of the base.

3. The component according to claim 1, wherein the elevation has at least one height of 0.5 mm relative to the base surface.

4. The component according to claim 1, wherein the elevation has at least one height of at least 0.1 mm relative to the base surface.

5. The component according to claim 1, wherein the formation is substantially pot-shaped.

6. The component according to claim 1, including a raceway on an inner side configured to support a plurality of rolling elements.

7. The component according to claim 6, including the plurality of rolling elements.

8. The component according to claim 1, wherein the elevation has at least one height of at least 0.1 mm relative to the base surface,
wherein the formation is substantially pot-shaped, and
including a raceway on an inner side of the component configured to support a plurality of rolling elements.

9. A universal joint bearing including the component of claim 1.

10. A method for processing a wall of a component of a universal joint bearing, the method comprising:
clamping the component by a formation on a base of the component, while the component is clamped,
machining an inner cylindrical surface or an outer cylindrical surface of the component, and without unclamping the formation,
machining the outer cylindrical surface or the inner cylindrical surface of the component.

11. The method according to claim 10, wherein the machining comprises a rotational machining.

12. The method according to claim 10, wherein the formation has at least one height of 0.5 mm relative to the base.

13. The method according to claim 10, wherein the elevation has at least one height of at least 0.1 mm relative to the base.

14. The method according to claim 10, wherein the formation is substantially pot-shaped.

* * * * *